MACHINE FOR MAKING HOLLOW GLASS ARTICLE

Filed July 12, 1961 6 Sheets-Sheet 1

INVENTOR
Hans Joachim Bittner
By: Kelman and Berman
Agents

INVENTOR

Hans Joachim Bittner

By: Kelman and Berman

Agents

MACHINE FOR MAKING HOLLOW GLASS ARTICLE

Filed July 12, 1961

INVENTOR
Hans Joachim Bittner
By: Kelman and Berman
Agents

INVENTOR
HANS JOACHIM BITTNER
by Walter S. Bleston
ATTORNEY

INVENTOR
HANS JOACHIM BITTNER
by Walter S. Bleston
ATTORNEY

MACHINE FOR MAKING HOLLOW GLASS ARTICLE

Filed July 12, 1961

INVENTOR
Hans Joachim Bittner
By: Kelman and Berman
Agents

United States Patent Office 3,189,425
Patented June 15, 1965

3,189,425

MACHINE FOR MAKING HOLLOW GLASS ARTICLE

Hans Joachim Bittner, Hagen, Westphalia, Germany, assignor to H. Putsch & Company, Hagen, Westphalia, Germany Filed July 12, 1961, Ser. No. 123,550
Claims priority, application Germany, July 19, 1960, P 25,385
5 Claims. (Cl. 65—237)

This invention relates to a new method of making hollow glass articles, such as bottles, flacons, or the like, and a machine for performing the method, wherein in known manner a lump of glass is first pre-blown to form a parison in a gathering mold after the mouth of article has been formed, using a mouth mold, and is final-blown in a final mold.

In machines for making hollow glass articles it is known to pre-blow and final-blow the glass articles at separate stations. Various transfer devices have also been disclosed, by means of which the pre-blown parison is movable between the pre-molding and final-molding station, for example by means of a two-piece neck ring. In one particular form of construction, the parison is blown into its final shape in the final mold while being rotated about its vertical axis. The neck ring serves as a transfer clamp, by means of which each parison is brought from the first station to the final-molding station, the parison being introduced between the open parts of the final mold while being suspended from the neck ring. The final-mold halves are closed around the suspended parison for the purpose of taking the latter from the neck ring, the latter naturally having to be opened in order to release the parison.

The transfer of the parison must take place as rapidly as possible so that the neck ring may be returned as quickly as possible to the parison molding station for use in molding the next parison of the series. As soon as the neck ring has been moved away, the parison is blown into its final shape in the closed final mold and is removed therefrom by a removal device.

Since the blowing processes in the gathering and final molds, the transfer between the two stations, and the return of the holding device to the pre-molding station occupy a certain amount of time, various proposals have been made to increase the number of finished articles produced per unit of time for a given molding machine. Most of these proposals relate to efficient cooling devices for the final mold so that the final-blown hollow glass article can be removed from the final mold as quickly as possible after it has been completed. Machines have also been disclosed wherein this object is intended to be achieved with double molds at the pre-blowing and final-blowing station, these double molds enabling substantially twice the number of articles to be made per unit of time without doubling the expense incurred. Excessively rapid cooling of the final mold should, however, be avoided so that the stresses which unavoidably occur in the glass may be kept as low as possible.

In the present invention, the final-molding time is increased while a higher thoughtput per unit of time is achieved.

The object of the invention is to reduce the total time required in the manufacture of hollow glass articles in a simple manner while extending the final-molding time. To solve this problem, the mouth molds are so disposed that they operate both as devices for transferring the parison from the gathering mold to the final mold and as holding devices. At least two mouth molds are provided, each of which can operate independently of the other but which can be interlocked in a machine to operate-jointly in a cycle. The hollow article to be manufactured remains in one of the mouth molds during the entire production process. As a result of this new blowing process and the favourable structural arrangement of the gathering and final mold or molds in relation to one another, as explained in detail in the following description of the drawings, the length of each working cycle can be greatly reduced while the final-molding time may be increased by up to 20%, with respect to conventional final-molding times.

The lengthening of the final-mold blowing time is important if the rate of production is to be increased. To this end, according to the invention, the transfer movement and the removal movement are combined in the mouth mold driving unit and two mouth molds are provided for each gathering mold and final-mold unit. It is thus possible largely to obviate dead times which occur in other machines during the lifting away of the final-blowing head in long strokes, and the swinging in of the extractor. Nor is it necessary in the arrangement of the invention for a transfer device to be swung back from the final mold to the gathering mold. The pre-molded parison remains in the mouth mold during the final-blowing operation, so that immediately after the final mold has been closed the blowing head can be fitted and the final-blowing process begin. The fact that the gathering and final molds are situated one above the other permits the blowing head stroke to be kept extremely short so that the final molding time can be increased by the time saved.

It is characteristic of the invention that the mouth mold in which the mouth of the article to be molded is formed not only transfers the said article into the final mold but also keeps it therein during the final molding operation and guides it out of the final mold. The mouth mold preferably performs a cycle as follows: after the mouth of the article has been molded in the gathering mold and the parison has been blown, the mouth mold is centrally connected to the final mold. After the latter has been opened, the mouth mold is guided with the final-blown article to a delivery station at which it opens to deliver the article, and is then returned to the gathering mold in the closed state.

This method employing a plurality of mouth molds has the advantage that if, for example, a double mouth mold arrangement is adopted, the final mold closes about the fixed mouth so that cracks or damage to the mouth during transfer owning to incorrect or unskilled handling are impossible since the final mold can be adapted to the position of the mouth mold by an appropriate closing gear.

With difficult types of bottles, the bottle may be blown out of the top of the final mold during the final blowing operation because of an operator's error. In the machine of the present invention this is avoided so that bottles having accurate length tolerances can be made.

When a double mouth mold is used it is also impossible for the glass article to be pulled to one side and to fall over during opening of the final mold as frequently occurs with angular or deeply engraved bottle bodies in other machines. In the machine according to the invention the glass article is centered and held fast by the mouth mold in the first stage of mold opening.

Further details and features of the invention will be apparent from the following description of the accompanying drawing which shows a preferred embodiment of a bottle molding machine according to the invention having two mouth molds.

Figure 1:
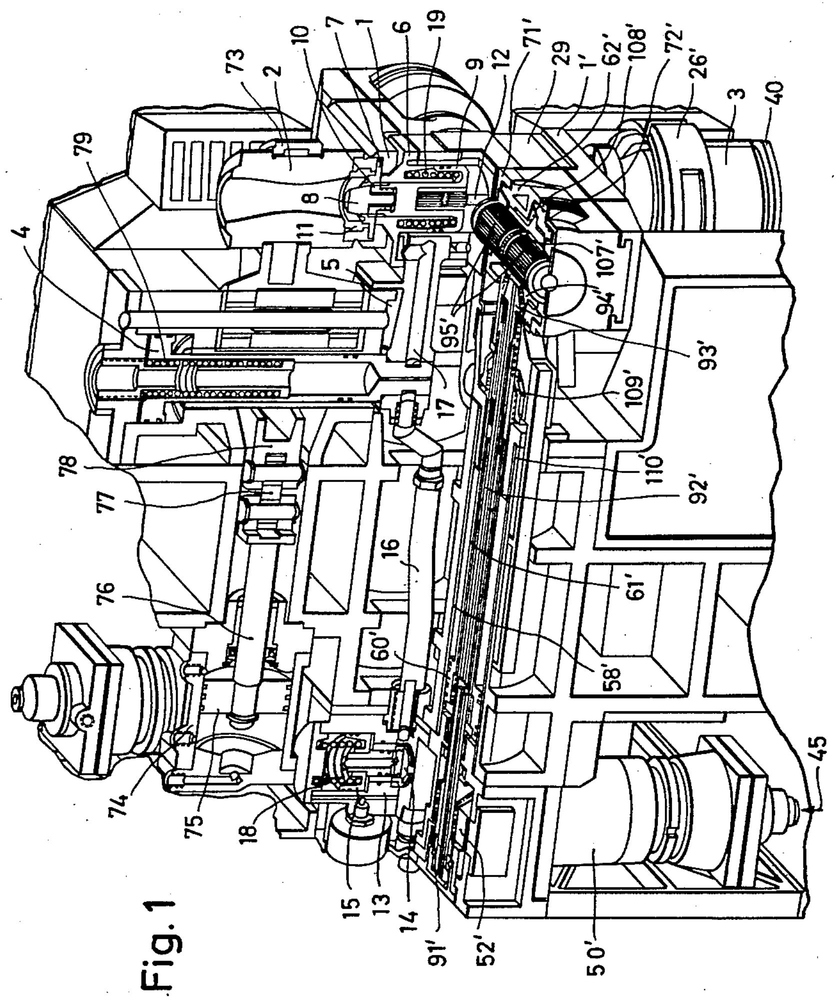
FIGURE 1 is a perspective view of the molding machine with portions of the machines cut away to reveal internal working parts.

FIGURES 7*a* and 7*b* are diagrams illustrating the movements of two mouth molds in a molding machine.

In all figures, like references have been used for like parts. Unprimed numbers relate to a mouth mold 1 and related upper drive and control units, holders, guides and so on, while primed numbers relate to a mouth mold 1'. For an understanding of FIGURE 6 it should also be pointed out that the diagrammatically indicated conduits carry different air according to their marking. The solid-like conduits carry controlled working air while the broken-line conduits carry permanent air and the chain-dotted conduits carry control air. It should also be pointed that the two mouth rocking cylinders 50 and 50' in FIGURE 6 have been turned into the drawing plane. In actual fact the cylinder sides marked by the venting ducts 103 and 103' are at the bottom of the machine.

For an explanation of the new method and machine, reference will first be made to the drawings to describe one working stroke of the machine which has a supporting frame 120. Initally, the mouth mold 1 is situated beneath a closed gathering mold 2 at the beginning of a new working stroke to define a premolding cavity therewith, and that the mouth mold 1' is situated above a closed final mold 3 to define a final-blowing cavity for the parison pre-molded in the preceding working stroke. A gauge cylinder 6 fastened on an arm 5 is then pressed by a piston 4 against a sealing ring 7 which centres the mouth mold 1, so as to provide a vacuum-tight and pressure-tight connection between the gauge cylinder 6 and the mouth mold 1. A gauge 8 is then pressed into the mouth mold 1 by a gauge piston 9. The gauge 8 is mounted movably in a screwthreaded sleeve 10, so that it automatically centres itself in the sealing ring 7 or in a mouth insert 11. The gauge piston 9 is secured against turning by means of a splined bolt 12. The gauge 8 can also be secured against turning by means of a milled spring, which is guided in a corresponding slot in the gauge piston 9. This security is particularly necessary in the case of difficult flacon mouths.

During this stage of the working cycle, the gathering mold 2 receives by means of a drip-feed tube system or gravity tube (not shown in the drawing) a lump of glass cut off by a feeder. As soon as the lump of glass reaches the gathering mold 2 it is drawn into the mouth mold 1 by suction and gravity. The suction vacuum is controlled by a combined vacuum and blowing valve 13. This valve is equipped with a double-cone valve stem 14. The vacuum side of the valve 13 is opened by a working medium impulse which feeds working medium to a piston 15, so that the air between the lump of glass and the mouth mold 1 can be sucked off through a hose 16 and a duct 17. Under these conditions the liquid glass is sucked into the mouth mold 1, and fills the latter.

The vacuum side of the valve 13 is closed by a helical compression spring 18 by venting of the cylinder space behind the piston 15, and the double-cone stem 14 frees the path for the pre-blowing air. After the vacuum has been discontinued, the cylinder space beneath the gauge piston 9 is vented and the latter is drawn by a helical compression spring 19 with the gauge 8 out of the mouth mold 1. During the application of suction to the mouth, a gathering mold cover (not shown) is applied to the gathering mold 2 and closes the top of the gathering mold. The lump of glass in the gathering mold 2 is then blown to form the parison by means of a working medium impulse, the pressure and duration of which are controllable. This preblowing air flows through the double-cone valve 13, the hose 16, and the duct 17, into the gauge cylinder 6 and thence into the mouth mold 1, following the same path as the air extracted during the application of suction to the mouth mold 1.

At the same time at which the mouth mold 1' has reached the position above the final mold 3, a final-mold closing piston 21 guided in a mold closing cylinder 20 is subjected to the action of working medium so that the closing movement acts upon a final-mold holder 26, and the final-mold 3 fitted therein, by way of a piston rod 22 and a compensating link 25 fastened movably thereon and on a mold closing fork 23 by means of a pin 24, so that the final mold holder 26 which is mounted to be rotatable about a pin 27 closes and is centered around the mouth mold 1'. This centering operation is achieved by the fact that the mold closing fork 23 connected to the link 25 can slide in lateral guide plates 28 and thus the final mold 3 is axially aligned with the mouth mold 1'. The force required for closing the final mold is transmitted by links which establish a connection between the mold closing fork 23 and the final-mold holder 26. When pressure is applied to the final-mold closing piston 21, these links are pressed into the dead-centre position. The effect thus achieved is that no appreciable lateral pressure forces can act on the mouth mold 1'. Simultaneously with the closing movement of the final mold 3, a blowing head 30 fastened on an arm 29 is pressed by a blowing-head piston 31, which is subjected to the action of working medium, onto the sealing ring 7' of the mouth mold 1', so that the pressure-tight connection is established between the blowing head 30 and the mouth mold 1'. As a result of the blowing head 30 coming into contact, a cone valve 32 incorporated therein is opened and is continually subjected to the action of pressure-controlled working medium by means of a duct 33. This working medium can then pass through the open cone valve 32, a duct 34 and a nozzle 35, into the parison formed in the previous working stroke, and blow the same into the finished shape. After the required pressure has been reached in the bottle body, the heated working medium flows through ducts 36, an annular groove 37, and a spring-loaded relief valve (not shown) into atmosphere, while fresh working medium flows into the glass body in the final mold through the nozzle 35. The required positive pressure of working medium in the interior of the bottle can be adjusted continuously at this valve. The glass body is cooled intensively by the resulting circulation of working medium.

The air remaining between the parison and the final mold 3 after the parison has been introduced into the said mold can be evacuated through ducts 38 engraved in the mold 3 and ducts 39 provided in a final-mold base 40, and a base carrier 41, by connection to the vacuum. This is effected by means of a double-cone valve (not shown), the construction of which corresponds to the valve 13 of the gauge cylinder. The pressure side of the double-cone valve stem serves to apply air to the suction passages to ensure easy opening of the final mold 3, after the vacuum supply pipe has been disconnected.

The final blowing and/or final sucking of the hollow glass body in the final mould 3 continues until the amount of heat taken from the glass article by the cooled mold 3 and the circulating working medium in the interior of the bottle is such that when the final mold is open the article retains its shaper while being suspended in the mouth mold 1'.

This is another considerable advantage of the double mouth mold arrangement, namely that the glass article while being suspended in the mouth mold 1' can be ejected from the open final mold 3 when the final mold base 40 has been drawn down. The drawn-down final mold base enables the speed of production to be increased since the relatively hot side surfaces and base parts of the molded glass article—which are therefore easy to deform—are subjected to the load only of the weight of glass while, in a machine in which the glass article stands freely on the final mold base when the final mold is opened, the hot parts are additionally subjected to the load of the weights of the much colder top side parts, front, neck and mouth of the glass article. This means that with otherwise identical stresses the glass article can be delivered from the final mold 3 in a much hotter state when the machine is equipped with a double mouth mold, so that the speed of production can be increased.

Figure 2:
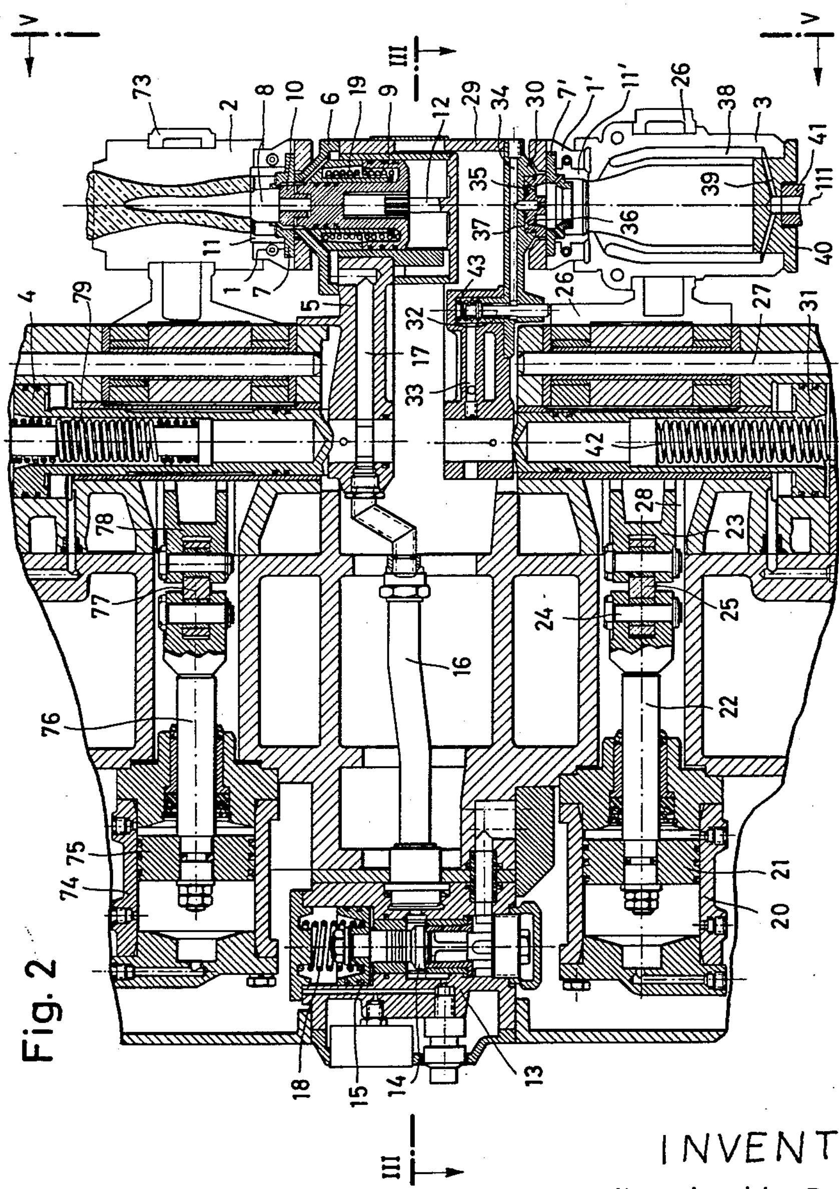
FIGURE 2 shows a detail of the machine of FIG. 1 in side-elevational section on the line II—II in FIGURE 3.
Figure 5:
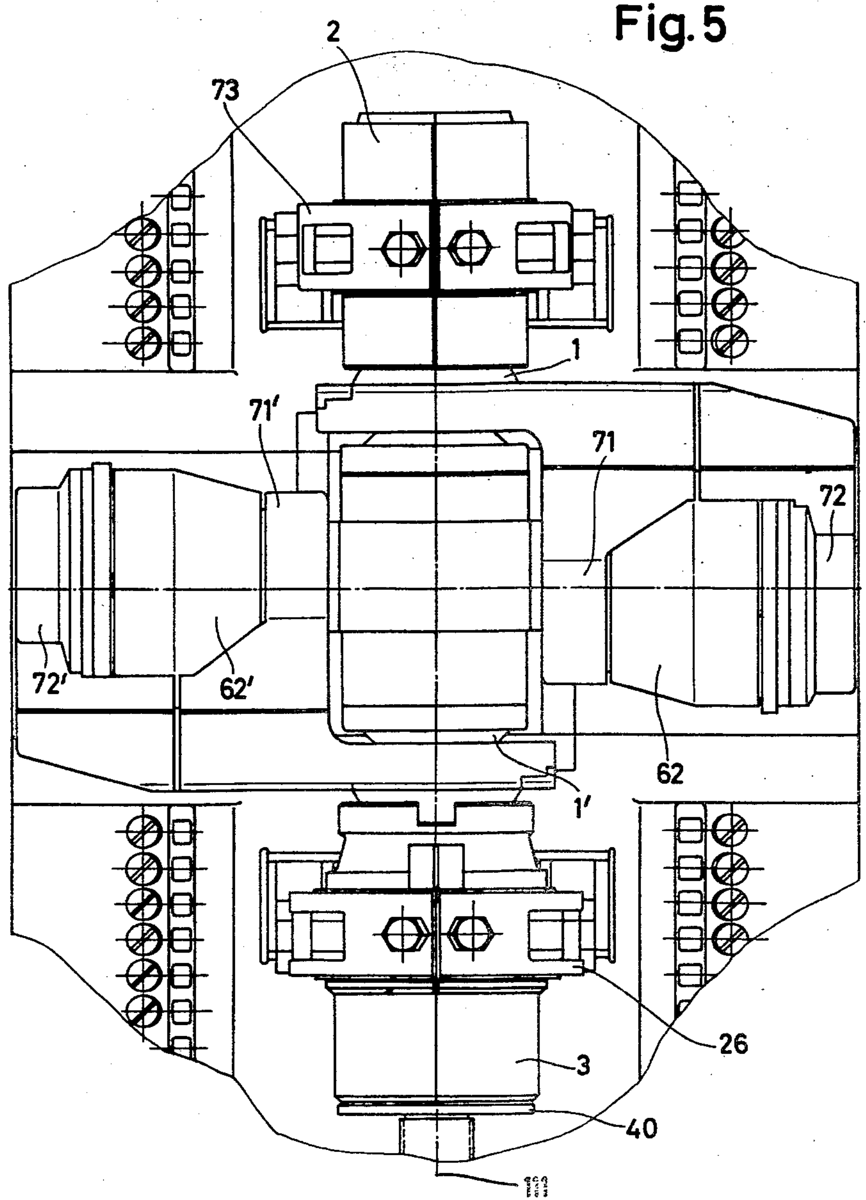
FIGURE 5 is an end view of the machine taken in the direction shown by arrows V—V in FIGURE 2.

After completion of the final molding process and after sufficient heat has been dissipated, the rear space in the mold closing cylinder 20 is vented and the front space of the cylinder 20 is subjected to working medium and the final-mold holder 26 with the final mold fitted therein is opened by withdrawal of the piston rod 22 and the closing fork 23 while at the same time the final mold base 40 together with the base carrier 41 is drawn back by a piston 111 (see FIGURE 5) not shown in FIGURE 2. The blowing head 30 is lifted away from the mouth mold 1' by a helical compression spring 42 as a result of the venting of the cylinder space above the blowing head piston 31 and the cone valve 32 is closed by a helical compression spring 43 so that the supply of compressed air for blowing purposes is interrupted. The finally molded glass article then hangs freely in the open final mold.

Figure 6:
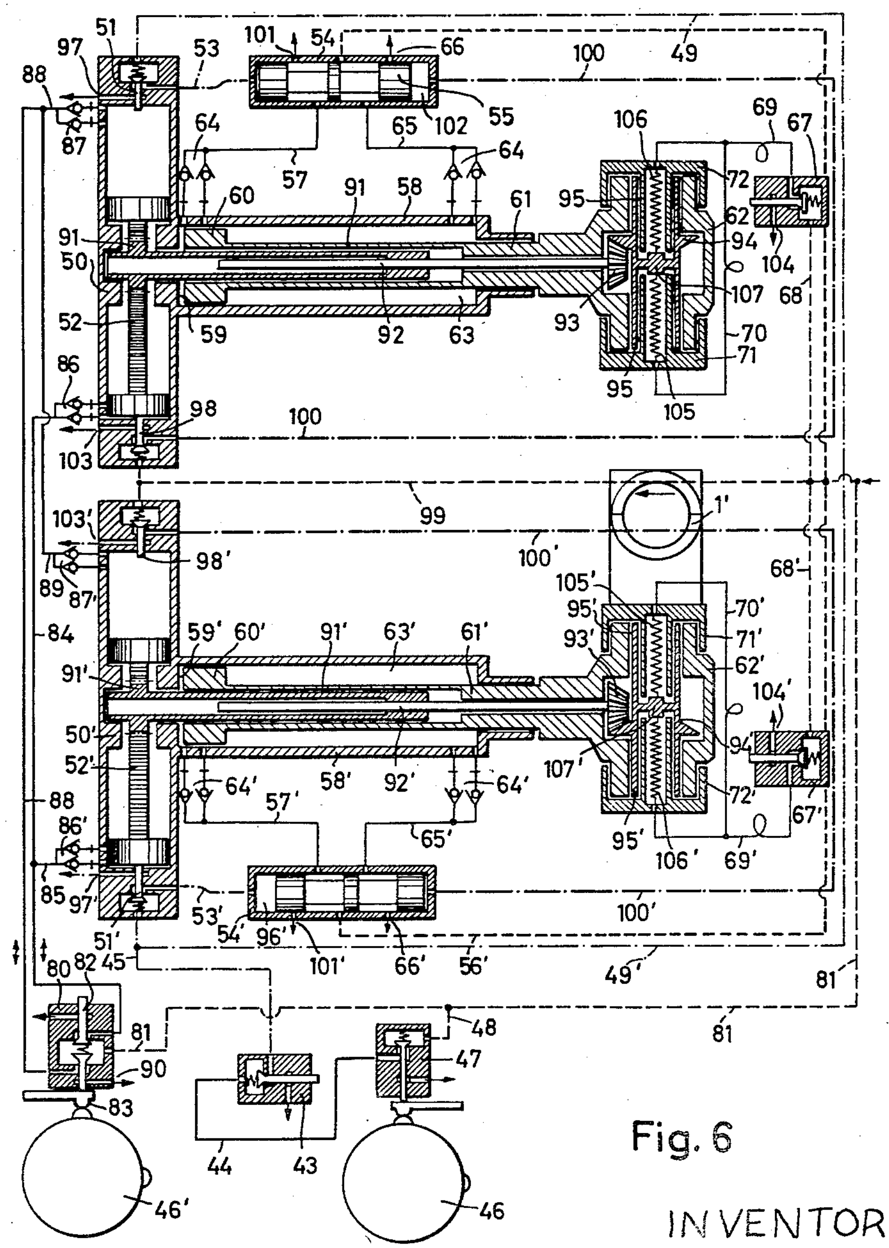
FIGURE 6 is a diagram of the control system of the molding machine.

FIGURE 6 will be referred to in the following description of the control mechanism of the machine.

In its end position, the open final mold operates a stop cone valve 43" which is incorporated in conduits 44 and 45 as a safety valve in order to prevent any ejection of the mouth mold 1' before the opening of the final mold or from receiving an incorrect control impulse. This control command is immediately transmitted by a cam control 46 through a three-way control valve 47 after the final mold has been opened, the said three-way control valve 47 being continually subjected to the action of the working medium by way of a conduit 48. The control impulse passes through the conduit 44 and the stop safety valve 43" to conduits 45 and 49. Stop cone valves 51 and 51' are also incorporated in mouth mold rocking cylinders 50 and 50' in such a manner as to be capable of being opened alternately by rack pistons 52 or 52' for rocking the mouth molds. The arrangement is such that only that mouth mold rocking piston whose associated mouth mold 1 and 1' is situated just above the final mold can open a stop cone valve 51 and 51'. In the working stroke illustrated, the control impuse can pass from the conduit 45 through the stop cone valve 51' and a conduit 53" to a four-way control valve 54', in which a control piston 55' has been pushed into the position illustrated. In this position, working medium flows from a permanent air conduit 56' through the four-way control valve 54' and a conduit 57' to a mouth mold ejector cylinder 58' and acts upon a space 59' behind the rear of said cylinder, so that a mouth ejector piston 60' ejects a mouth carrier housing 62'—fastened on its piston rod 61'—together with the mouth mold 1' fastened thereon, from the final mold. In these conditions, a front space 63' of the mouth ejector cylinder 58' is vented to atmosphere by way of throttling non-return valves 64', a conduit 65', the four-way control valve 54' and an outlet aperture 66'. In FIGURE 6, the outlet apertures for venting the control system are respectively marked by small outwardly extending arrows. The valves 64 permit return air throttling for regulation of the speed of the piston 60, while the air can flow freely in the entry direction. The first throttling non-return valve effects the total stroke throttling, while the second enables the end stroke damping to be regulated.

After the mouth carrier housing 62' has reached the front position, it operates a stop cone valve 67', which is continually subjected to the action of working medium through a conduit 68'. On the opening of the valve stem, working medium flows through conduits 69' and 70' to mouth opening cylinders 71' and 72', which are each associated with one half of the divided mouth mold 1' and push the latter apart until the finished glass article is freed and is transferred at the transfer station from the mouth mold to a work which holds it above a cold blowing plate.

Figure 3:
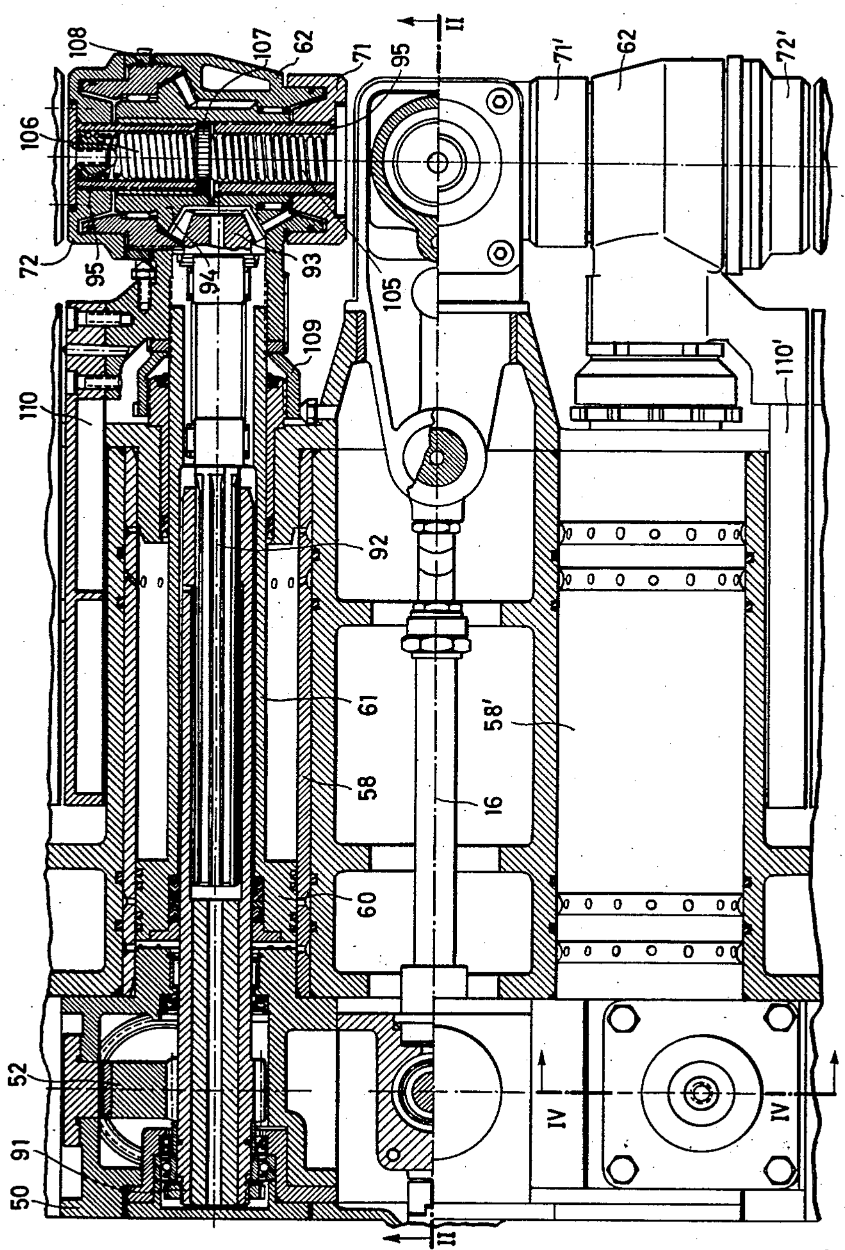
FIGURE 3 is a detail view of the machine of FIGURE 1 in plan section on the line III—III in FIGURE 2.
Figure 4:
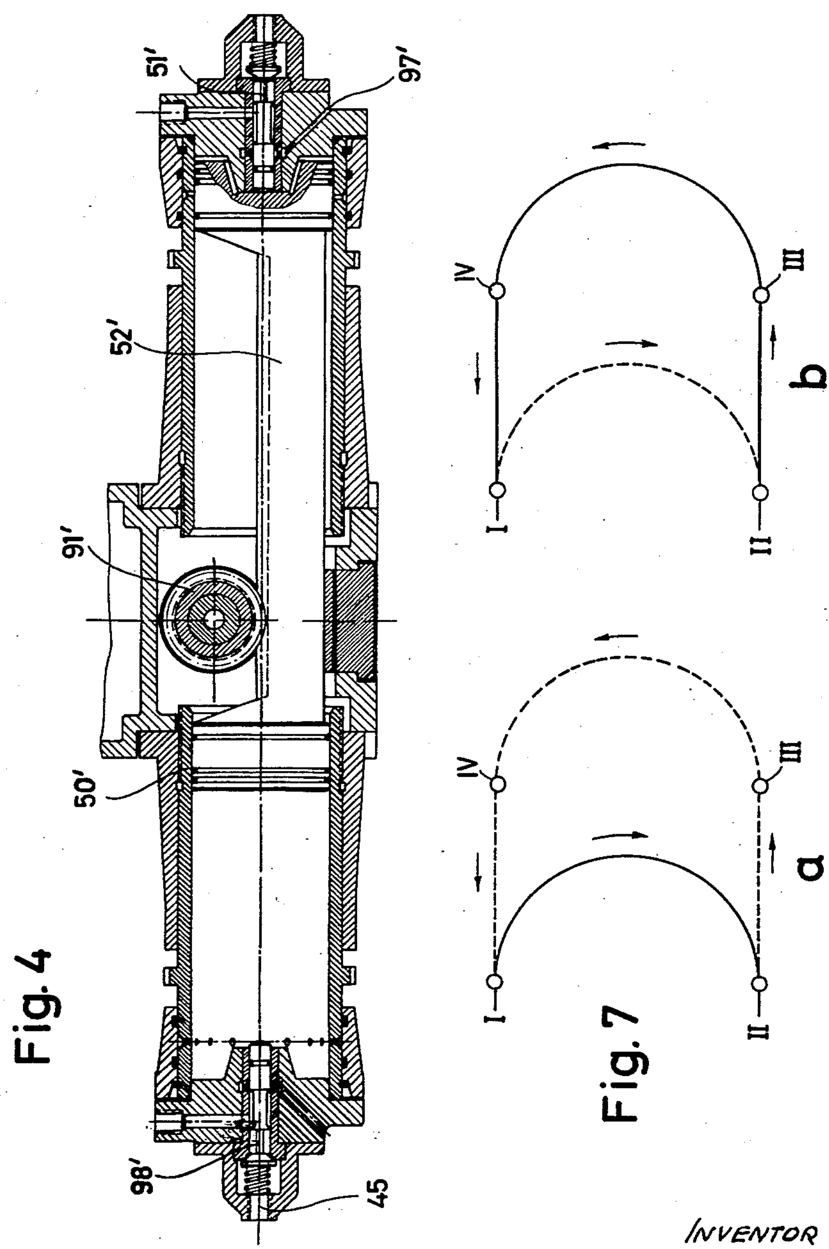
FIGURE 4 is another detail view of the machine in front-elevational section on the line IV—IV of FIGURE 3.

During the ejection of the mouth mold 1' from the final mold 3, the gathering mold 2 is opened on the same principle as the final mold 3. The gathering mold is also fitted in a gathering mold holder 73 (compare FIGURES 1 and 2) which is opened, when pressure is applied to a gathering mold closing piston 75 guided in a gathering mold closing cylinder 74, this opening being effected by way of a piston rod 76, a compensating link 77 and a gathering mold closing fork 78. Before the gathering mold 2 is opened, a gathering mold cap (not shown) fitted thereon is lifted away by a lifting cylinder. The cylinder space beneath the gauge cylinder piston 4 is vented so that the gauge cylinder 6 is pressed down out of the mouth mold 1 by a helical compression spring 79. The two mouth molds 1 and 1' are then ready for transfer. The mouth mold 1 is rocked down to a position above the final mold as shown in FIGURE 7 and the mouth mold 1' which has been pushed out is swung back up to a position beneath the gathering mold 2. This movement is effected by the mouth rocking cylinders 50 and 50', the cam operating drum 46' operating a four-way double-cone operating valve 80 (compare FIGURE 6) which continually receives working medium through a conduit 81. The valve side with a valve cone 82 is thus opened and the valve side with a valve cone 83 is closed. Working medium now flows in conduits 84 and 85 through throttling non-return valves 86, 86' to positions beneath and above the rack pistons 52 and 52', so that the rack piston 52 is pressed up and the rack piston 52' is pressed down and the working medium in the top and bottom cylinder chambers respectively is returned, through throttling non return valves 87 and 87', which permit total-stroke and end-stroke throttling, and conduits 88 and 89, to the four-way double-cone operating valve 80, where it can flow off into atmosphere through a duct 90. The rack pistons 52 and 52' which are pressed up and down respectively have turned pinion shafts 91 and 91' mounted in the mouth rocking cylinders 50 and 50' through 360°. This rotary movement is transmitted by splined shafts 92 and 92' to bevel gears 93 and 93' which are mounted in the mouth carrier housings 62 and 62'. The bevel gears 93 and 93' in turn rotate bevel gears 94 and 94' through 180°. Fitted to these bevel gears 94 and 94' are the sleeve parts in which the mouth opening cylinders 71 and 72, and 71' and 72', are guided in serrated profiles 95. By means of these profiles, which are shown in FIGURE 3, the 180° rotary movement of the bevel gears 94 and 94' is transmitted to the mouth opening cylinders 71 and 72 and 71' and 72' and hence also to the mouth molds 1 and 1' fastened on the latter. The pushed-out mouth mold 1' opened by the stop valve 67' is then rotated upwards, while the mouth mold 1 rotates in the downward direction to a position above the final mold 3, together with the parison from the gathering mold 3. The stop cone valve 51' is closed by the downwardly pressed rack piston 52', so that a cylinder space 96' in the four-way control valve 54' is vented through the conduit 53' and the working medium can flow off to atmosphere through a duct 97'. At its bottom stop the rack piston 52' opens a stop cone valve 98' which is continually subjected to the action of working medium from a conduit 99. This working medium can now reverse the control piston 55' by way of a control line 100'. As a result, the permanent air conduit 56' subjected to the action of working medium is connected to the conduit 65' so that the front cylinder space 63' of the piston 60' is subjected to air by way of the throttling non-return valve 64', which allow the working medium to flow through freely in this direction, and the piston together with the mouth carrier housing 62' fastened thereon and the swung-up mouth mold 1' is moved back so that the mouth mold 1' is situated beneath the opened gathering mold 2. In these conditions, the rear cylinder space 59' has been vented to atmosphere by way of the throttling non-return valves 64'—which determine the speed of the return movement of the pistons—and the conduit 57' and the four-way control valve 54', and a duct 101'. During its upward movement, the rack piston 52 closes the stop cone valve 98 so that a front cylinder space 102 situated in the position shown in FIGURE 6 in the four-way control valve 54 is vented to atmosphere through the conduit 100 and a duct 103. In its top end position (not shown in FIGURE 6) the rack piston 52 opens the stop cone valve 51, through which, after the final-blowing process has been completed, the control impulse can flow from the three-way operating valve 47 to control the next ejection movement for the mouth mold 1. In this position of the rack pistons 52 and 52', however, the control impulse is stopped at the stop cone valve 51'. As soon as the mouth mold 1 has reached the final-molding position by rocking through 180°, the final mold closes as already described around the mouth mold 1 and the parison after the final-mold base 40 has been brought into its top position by means of the base carrier 41 and the piston 111.

On the insertion of the mouth mold 1' beneath the gathering mold 2, the stop cone valve 67' closes instantaneously so that the working medium which pressed the mouth opening cylinders apart and hence opened the mouth mold 1' can escape through the conduits 70' and 69' and a duct 104' to atmosphere. Tension springs 105' and 106' pull the mouth opening cylinders 71' and 72' back into their closing position. Tension springs 106 and 106' are so designed that their force in both end positions of the pistons 72 and 72' is greater than that of the tension springs 105 and 105'. The effect of this is that when the collars 107 and 107' (FIGURE 3) which hold the two tension springs 105 and 106, and 105' and 106' respectively together bear tightly against fixed stops in the bevel gears 94 and 94'. The mouth opening cylinders 72 and 72' bear tightly against screwthreaded rings 108 and 108' (see FIGURE 1). The screwthreaded rings 108 and 108' serve for adjustment of the mouth molds in the direction of the rocking axis. By use of screwthreaded sleeves 109 and 109' (compare FIGURE 1), the mouth molds 1 and 1' can be adjusted in the opposite direction, while strips 110 and 110' serve for accurate parallel guidance of the two mouth molds.

The gathering mold closes as already described around the closed mouth mold 1' which is pushed into the premolding position. A new working stroke begins with the application of the gauge cylinder (6) and the supply of a new lump of glass to the gathernig mold and with the application of the blowing head (30) and/or when the final-suction is put into operation when the mouth mold 1 is in the final-molding position. During this next working stroke the mouth mold 1 performs the process of ejection, mouth opening and withdrawal of the mouth mold as described in the previous working stroke. The cam operating drum 46' performs only one revolution during two working strokes, unlike the cam operating drum 46 which performs a complete revolution per working stroke. The diagram shown in FIGURES 7*a* and 7*b* serves to explain the operations performed by the two mouth molds. The direction of movement of the two mouth molds 1 and 1' is shown in two consecutive working strokes. As in FIGURES 1 to 6, the mouth mold for the gathering mold is denoted by reference 1 and the mouth mold for the final mold by reference 1'. The stopping places of the two mouth molds at the individual stations are denoted by the numbers I to IV. Reference I denotes the pre-molding position, II the final-molding position, III the delivery position and IV the top return position of the mouth molds. The direction of movement of the mouth molds is indicated by arrows in both drawings. The solid lines indicate the paths of the mouth mold 1 while the broken lines indicate the paths of the mouth mold 1'.

In FIGURE 7*a* the direction of movement of the two mouth molds is shown in the first working stroke. The path of the mouth mold 1 from the pre-molding position I to the final molding position II takes place together with the movement of the mouth mold 1' from the delivery position III to the top return position IV. While the mouth mold 1 is being final-blown in the final-molding position II, the mouth mold 1' is brought from the top return position IV into the pre-molding position I, the mouth mold being closed. The mouth of the hollow glass body has suction applied to it here and the parison is pre-blown. During this, the mouth mold 1 is driven out of the final-molding position II with the completed hollow glass obpect and in the delivery position III the mouth mold is opened to deliver the finshed article.

Following upon this operation, the same cycle takes place with the mouth molds changed over from one another as shown in FIGURE 7*b*. The movement of the mouth mold 1' from the pre-molding position 1 to the final-molding position II takes place together with the movement of the mouth mold 1 from delivery position III to the top return position IV. While the pre-blown parison is being blown into its final shape in the mouth mold 1' in the final-molding position II, the mouth mold 1 is transferred from the top return position IV to the pre-molding position I while closing, suction applied to the mouth, and the parison is pre-blown. During the last operation, the hollow glass body blown in the mouth mold 1' in the final moulding position II has been transferred to the delivery position III and the finished article has been deposited there after the opening of the mouth mold 1'. The cycle shown in FIGURE 7*a* is then repeated.

As already stated, this example employing two mouth molds is not intended to limit the invention but serve simply as an example of embodiment. A machine of this kind can equally well be operated with three, four or more mouth molds mutually complementing one another in the operations of a complete cycle.

I claim:

1. In a machine for making glass bottles and like hollow glass articles, in combination:

(a) a support;

(b) a gathering mold;

(c) a final mold;

(d) two mouth molds, (1) said gathering mold, final mold, and mouth molds being mounted on said support, and each having a plurality of parts movable relative to each other between an open position and a closed position, (2) said gathering mold and said final mold in the closed position thereof having a common axis fixed relative to said support, and (3) said mouth molds each being movable in cyclic sequence from a first position, in which the mouth mold defines a pre-molding cavity with said gathering mold, to a second position in which said mouth mold defines a final-molding cavity with said final mold, to a delivery position spaced from said second position, and thence to said first position;

(e) mouth mold moving means for moving said mouth molds through said positions thereof in said cyclic sequence;

(f) mouth mold operating means for sequentially moving the parts of each mouth mold from the closed to the open position thereof when the mouth mold is in said delivery position thereof, for moving said mouth mold parts from the open to the closed position after said mouth mold reaches said delivery position and before the mold leaves said first position, and for keeping said mouth mold parts in the closed position while said mouth mold is being moved from said first position to said second position and thence to said delivery position thereof by said mouth mold moving means;

(g) gathering mold operating means and final mold operating means for moving said parts of said gathering mold and of said final mold between said open and closed positions thereof; and (h) control means for actuating said mouth mold moving means, said mouth mold operating means, said gathering mold operating means, and said final mold operating means in timed sequence.

2. In a machine as set forth in claim 1, said control means including means actuating said gathering mold operating means and said final mold operating means to move the respective mold parts from the open position to the closed position thereof when said mouth molds respectively are in said first position and said second position thereof.

3. In a machine as set forth in claim 1, said final mold including a base member axially spaced from said mouth mold when the same is in the second position thereof, and constituting a radially extending wall of said final-molding cavity, said final mold actuating means including means for moving said base member in an axial direction, and said control means including means for actuating movement of said base member by said moving means axially away from said mouth mold prior to movement of each mouth mold from said second position to said delivery position thereof.

4. In a machine as set forth in calim 1, said mouth molds each being movable in said cyclic sequence from said delivery position to said first position through a return position, said mouth mold moving means including means for moving one of said mouth molds in an arcuate vertically extending path from said first position to said second position, and for simultaneously moving the other mouth mold in an arcuate vertically extending path from said delivery position to said return position, and for moving said mouth molds from said return position to said first position, and from said second position to said delivery position in respective vertically spaced horizontally extending paths.

5. In a machine as set forth in claim 4, said control means including means actuating the closing of each mouth mold by said mouth mold operating means while the mouth mold moves from said return position to said first position in said cyclic sequence.

References Cited by the Examiner

UNITED STATES PATENTS

| | | | |
|---|---|---|---|
| 1,875,202 | 8/32 | Aftergut | 65—207 |
| 2,190,042 | 2/40 | Pearson | 54—233 X |
| 2,227,374 | 12/40 | Benoit et al. | 65—159 |

FOREIGN PATENTS

| | | |
|---|---|---|
| 114,477 | 4/18 | Great Britain. |

DONALL H. SYLVESTER, *Primary Examiner.*